(12) United States Patent
Dohnomae

(10) Patent No.: US 9,937,436 B2
(45) Date of Patent: Apr. 10, 2018

(54) SILICON REFINING EQUIPMENT AND METHOD FOR REFINING SILICON

(75) Inventor: Hitoshi Dohnomae, Tokyo (JP)

(73) Assignee: Silicio Ferrosolar S.L., Madrid (ES)

( * ) Notice: Subject to any disclaimer, the term of this patent is extended or adjusted under 35 U.S.C. 154(b) by 920 days.

(21) Appl. No.: 14/374,687

(22) PCT Filed: Feb. 3, 2012

(86) PCT No.: PCT/JP2012/052467
§ 371 (c)(1),
(2), (4) Date: Oct. 2, 2014

(87) PCT Pub. No.: WO2013/114609
PCT Pub. Date: Aug. 8, 2013

(65) Prior Publication Data
US 2015/0068885 A1    Mar. 12, 2015

(51) Int. Cl.
*C01B 33/037* (2006.01)
*B01D 1/30* (2006.01)
*B01D 5/00* (2006.01)

(52) U.S. Cl.
CPC ............... *B01D 1/30* (2013.01); *B01D 5/006* (2013.01); *C01B 33/037* (2013.01)

(58) Field of Classification Search
CPC .................................................. C01B 33/037
See application file for complete search history.

(56) References Cited

U.S. PATENT DOCUMENTS

| | | | | |
|---|---|---|---|---|
| 2010/0040526 A1* | 2/2010 | Wambach | ............. | C01B 33/037 423/349 |
| 2011/0142724 A1* | 6/2011 | Moon | .................... | H05H 1/48 422/186 |
| 2011/0306187 A1* | 12/2011 | Dold | .................... | C01B 33/037 438/478 |

(Continued)

FOREIGN PATENT DOCUMENTS

| FR | 2 909 990 A1 | 6/2008 |
|---|---|---|
| JP | 07-309614 A | 11/1995 |
| JP | 2000-247623 A | 9/2000 |

(Continued)

OTHER PUBLICATIONS

Computer translation and Patent Abstract of Japan JP 2009-247623 A.

(Continued)

*Primary Examiner* — Cynthia Szewczyk
(74) *Attorney, Agent, or Firm* — Ladas & Parry LLP

(57) ABSTRACT

In this method for refining silicon by vacuum melting, the falling of impurity condensate from an impurity trap located above a crucible and contamination of the molten silicon are prevented. A crucible for housing molten silicon, and a heating means for heating the crucible are located inside a treatment chamber equipped with a vacuum pump; further provided are: an impurity trap having an impurity condensation unit for cooling and condensing the vapor of impurities evaporating from the liquid surface of the molten silicon; and a contamination prevention device for preventing contamination of the molten silicon, having an impurity catch unit for catching impurities when impurities trapped by the impurity trap fall.

10 Claims, 9 Drawing Sheets

(56) References Cited

U.S. PATENT DOCUMENTS

2012/0159993 A1* 6/2012 Geertsen ................ C01B 33/02
                                                                                            65/99.1

FOREIGN PATENT DOCUMENTS

| JP | 2005-231956 A | 9/2005 |
| JP | 2006-315879 A | 11/2006 |
| JP | 2008-179509 A | 8/2008 |

OTHER PUBLICATIONS

Computer translation and Patent Abstract of Japan JP 07-309614 A.
Computer translation and Patent Abstract of Japan JP 2008-179509 A.
European Search Report dated Oct. 23, 2015 for Application No. EP 12 867 534.5.
Espacenet English abstract of JP 2005-231956 A.
Espacenet English abstract of JP 2006-315879 A.
Espacenet English abstract of FR 2 909 990 A1.

* cited by examiner

SILICON REFINING EQUIPMENT AND METHOD FOR REFINING SILICON

RELATED APPLICATION INFORMATION

This application is a 371 of International Application PCT/JP2012/052467 filed 3 Feb. 2012 entitled "Silicon Refining Equipment and Method for Refining Silicon", which was published on 8 Aug. 2013, with International Publication Number WO 2013/114609 A1, the content of which is incorporated herein by reference.

TECHNICAL FIELD

The present invention relates to a silicon purification method in order to purify metallic silicon raw material with a high concentration of impurities to a highly pure silicon which can be used in the manufacture of solar cells and the like.

PRIOR ART

To date, the silicon raw material for use in solar cells employed the scrap silicon generated in semiconductor manufacturing processes. However, as a result of the fast pace of the expansion in demand for solar cells in recent years, the level of supply of scrap has been overtaken, and there is a fear that there will be a shortage in supply of silicon raw material for use in solar cells. The silicon raw material which can be employed in the manufacturing processes of semiconductors is manufactured using a process which is expensive, and the cost thereof is excessive when a direct supply route is used to the manufacturing processes of solar cells. For that reason, the development of manufacturing processes of high purity silicon employing metallurgical processes such as vacuum fusion or solidification purification to manufacture high purity silicon from inexpensive metallic silicon raw material with high concentrations of impurities has progressed.

Metallurgical processes are purification processes for silicon combining various metallurgical processes employing the differences in physical behaviour of silicon and the impurity elements. In regard to the removal processes for impurity elements with higher vapour pressure than silicon (Si) with phosphorus (P) as a typical example, the application of the vacuum fusion method has been investigated. Hereafter, the terminology used is that of the phosphorus removal using the vacuum fusion method, but impurity elements other than phosphorus with a higher vapour pressure than silicon may also be removed in tandem with phosphorus removal.

As the basic configuration of devices employing the vacuum fusion method, there are heating devices fitted with a heater and a crucible in a vacuum vessel, which can have their internal pressure reduced using a vacuum pump. The crucible is filled with metallic silicon raw material containing a high level of phosphorus with more than tens of ppm of phosphorus, and this is heated and melted under reduced pressure in the presence of an inert, gas, and the melt is held for a fixed period of time under reduced pressure and at a temperature above the fusion point. Because the phosphorus has a higher vapour pressure than silicon, it is selectively evaporated, and the concentration of phosphorus in the silicon is reduced over time.

As described above, while the phosphorus removal process technology by means of the vacuum fusion method relies on very simple basic principles, normally, the phosphorous evaporation velocity from the silicon melt is not very great, in addition to the required phosphorus concentration in the product after phosphorus removal being as low as 0.1 ppmw or less. For this reason, expensive device configurations have been investigated such as vacuum pumps with the high exhaust volume and electron beam heaters and the like, but an inexpensive silicon purification method was not enabled.

Patent reference 1 refers to a silicon purification device and a silicon purification method employing that silicon purification device equipped with at least a crucible containing the silicon, and a heating device heating said crucible in a reduced pressure vessel equipped with a vacuum pump, wherein an impurity capture device is disposed at a location facing either or both of the surface of the silicon melt in said crucible and/or the aperture means of the crucible. In other words, at the same time as the impurity removal by means of said vacuum fusion method were based on basic principles, a performance improvement and a reduction in facilities cost were enabled simultaneously, in the establishment of a phosphorus removal process by means of a vacuum fusion method which merited industrialisation.

Patent reference 1 refers to an impurity capture device capturing the phosphorus evaporated from the silicon melt, at the same time as the capture of the silicon or silicon oxide evaporated from the silicon melt, in other words, the phosphorous is converted to an impurity condensation substance, condensed at a very high concentrations, in a separation and removal method from the silicon melt. The impurities capture device is a simple and inexpensive device comprised of a water cooled disc shaped metallic member, or a water cooled cylinder shaped metallic member, or a water cooled coil shaped metallic member, or a metallic disc cylinder shaped plate cooled by radiation cooling by means of these water cooled members, and is disposed at a position facing the surface of the silicon melt above the crucible. By the use of these, a higher phosphorus removal velocity is enabled, compared with the prior art, enabling the removal of this phosphorus from the silicon melt even with a lower degree of vacuum than in the prior art.

PRIOR ART REFERENCES

Patent References

Patent reference 1: Japanese laid open unexamined patent publication 2005-231956

OUTLINE OF THE INVENTION

Problems to be Solved by the Invention

However, in the prior art technology, as the number of charges increased, in order to enable continuous processing of the metallic silicon raw material, there was the problem that the stabilised reduction of the phosphorus concentration in the silicon melt after processing was not enabled. For that reason, when the inventors investigated the reasons for that, because the condensed impurities captured by the impurities capture device were those generated in the space above the silicon melt, they discovered that there was the possibility of the dropping down thereof, into the silicon melt. In the event that the condensed impurities dropped down into the fused silicon, because the condensed impurities contained phosphorus condensed at a very high concentration, even when only a small amount got mixed in, the phosphorus concentration in the silicon melt was raised. In addition, the amount dropped down was not always the same, and because it was difficult to suppress it, there was a large variation between charges in the phosphorus concentration in the silicon melt after processing, and in order to sustain product quality, there was no other option but to lengthen the processing time, leading to a reduction in productivity. Furthermore, when continuous processing exceeded a specific number of charges, it was discovered that processing to below the required phosphorus concentration for raw materials for use in solar cells was not possible.

In respect of the removal of impurities represented by phosphorus by means of vacuum fusion, the present invention has as its object the provision of a silicon purification device and purification method enabling continuous and stable impurity removal, while preventing the dropping down of condensed impurities with high concentrations of phosphorus and the like from the impurity capture device disposed above the crucible.

SUMMARY OF THE INVENTION

The present invention was conceived of in order to resolve the issues described above, and the gist of it is as follows:

(1) A silicon purification device separating and removing the vaporised impurities from the silicon melt generated by the heating and fusion of silicon at reduced pressure, which is provided with a processing chamber at a reduced pressure which is reduced to below a specific pressure by a pressure reduction means, and a crucible containing the silicon which is provided disposed in the processing chamber, and a heating means heating the silicon in that crucible, characterised by being provided with a contamination prevention device preventing contamination of the silicon melt, equipped with an impurities capture device having an impurities condensation means cooling and condensing the vapour of impurities vaporising from the liquid surface of the silicon that, as well as an impurities reception means receiving and containing the impurities, on the location of the dropping down of impurities captured by the impurities capture device, and on the occasion of silicon purification processing, the impurities reception and containment means of the contamination prevention device is located in the standby position, and the vapour of the impurities is condensed by impurities condensation means of the impurities capture device, and moreover, when the silicon purification processing is suspended and/or terminated, the impurities reception and containment means of the contamination prevention device is located at the operating position between the impurities condensation means of the impurities capture device and the liquid surface of the silicon melt, and receives and contains the impurities dropping down.

(2) The silicon purification device described above in (1) wherein the impurities reception and containment means has a thermal blocking surface blocking the thermal radiation from the liquid surface of the silicon melt in respect of the impurities of the impurities condensation means in respect of the operating position, and not only causes the dropping down of the thermally condensed impurities of the impurities condensation means, but also has a containment surface receiving and containing the impurities dropping down on the opposite side of the thermal blocking surface.

(3) The silicon purification device described in (1) or (2) above, wherein the contamination prevention device is provided with a reception and containment means displacement mechanism holding the impurities reception and containment means in a movable manner between the processing chamber and the preparation chamber, which connects the preparatory chamber to the processing chamber via a gate valve provided on the reduced pressure means, and on the occasion of silicon purification processes, the impurities reception and containment means is on standby in the preparatory chamber, moreover, on the occasion of suspension and/or termination of the silicon purification processing, the impurities reception and containment means is located in the operational position of the interior of the processing chamber.

(4) The silicon purification device described in any of (1)~(3) above, wherein the reception chamber for the melt provided with both a pressure reduction means and a receptor for fused silicon is connected to the processing chamber via a gate valve, and the purified silicon is received and recovered in a vessel in the melt reception chamber.

(5) The silicon purification device described in any of (1)~(4) above, wherein a raw material supply chamber equipped with a pressure reduction means and a raw material insertion hopper are connected to the processing chamber via a gate valve, and continuous processing is enabled by the insertion of silicon raw material containing impurities, after the purified silicon is recovered.

(6) A silicon purification method removing the impurities in silicon using the silicon purification device described in any of (1) or (5) above, characterized by including a capture stage of the impurities evaporating from the liquid surface of the silicon melt using an impurities capture device, and a prevention stage of contamination of the silicon melt operated by the contamination prevention device.

(7) The silicon purification method described in (6) above wherein the pressure in the processing chamber is caused to be less than 500 Pa as well as the silicon in the crucible being heated to more than the fusion point of silicon in the capture stage of impurities, and the pressure in the processing chamber is caused to be greater than 500 Pa in the prevention stage of the contamination of the silicon melt.

(8) The silicon purification method described in (6) or (7) above wherein there is repetition of the capture of impurities stage continuously in the silicon purification after the removal of the impurities received and contained in the impurities reception and containment means in the prevention stage of the contamination of the silicon melt.

(9) The silicon purification method described in any of (6)~(8) above wherein there is the performance of the recovery of the purified silicon in the crucible in respect of the contamination prevention state of the silicon melt.

Effects of the Invention

In the present invention, with a silicon purification method providing an impurities capture device capturing impurities, and a contamination prevention device preventing the contamination of the silicon melt receiving and containing the impurities dropping down from the impurities capture device, the provision of high purity silicon stably and inexpensively is enabled.

EMBODIMENTS OF THE INVENTION

The present invention is a purification method and purification device of silicon by means of a simple device providing a crucible and a general purpose heating means which is set in a reduced pressure vessel forming the processing chamber. However, the purification in the present invention is the removal of impurity elements with high vapour pressure such as phosphorus and the like, in addition, in regard to impurities other than phosphorus, the present invention may be applied in the removal of elements with a higher vapour pressure than silicon, for example, Al, As, Sb, Li, Mg, Zn, Na, Ca, Ni, Ge, Cu, Sn, Ag, In, Mn, Pb, Ti, Si etc. Hereafter, the removal of phosphorous is referred to as the representative of the impurities, but the impurities other than phosphorus are naturally included as the subject of separation and removal in the silicon purification of the present invention.

The First Embodiment

Figure 1:
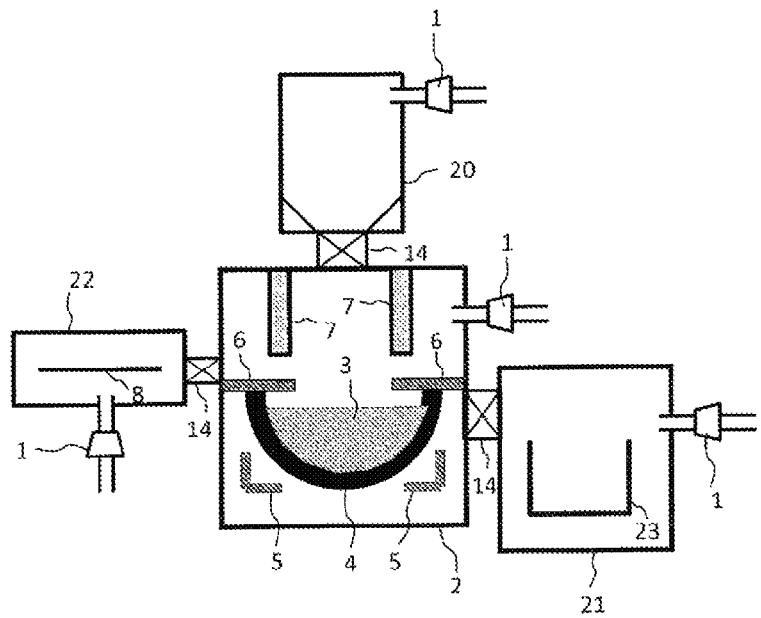
FIG. 1: A schematic drawing of the silicon purification device of the present invention providing a contamination prevention device.

The first embodiment of the present invention is explained by means of the configuration of the purification device represented in FIG. 1.

Firstly, a crucible 4, in order to hold the silicon melt 3, and the heating means 5, in order to hold the fused state of the melted silicon, and the temperature retention means 6, in order to maintain the temperature of the silicon melt 3, are set in a processing chamber 2 whose pressure can be reduced to below a specific pressure and which is provided with the vacuum pump 1 as the pressure reduction means.

The vacuum pump 1 needs to enable a pressure reduction of the processing chamber 2 to below 500 Pa, and for example, while an oil sealed type pump is sufficient, if a mechanical booster pump, and an oil dispersion or a turbo molecular pump and the like are fitted, a more preferable pressure of less than 10 Pa is enabled and is preferable, enabling a further contraction of the vacuum clearing period and the phosphorous removal time.

The crucible 4 is optimally of a high density graphite type which does not generate reaction gases with the silicon. Because crucibles made of oxides such as quartz react with the silicon under high vacuum conditions to generate silicon monoxide (SiO), the high vacuum state cannot be sustained, moreover, there is the problem that bumping of the silicon melt is caused by the boiling up of gases, and they are not suited to vacuum fusion in the purification of silicon.

The heating means 5 may be any heating means, as long as the heating of the silicon to beyond the fusion point is enabled, but a heater format which applies electrical potential to the heating element such as those made of graphite and the like, and heating the silicon melt 3 and the crucible 4 with Joule heating are the most convenient. An induction coil is disposed on the outer side of the graphite crucible 4, and an induction heating format heating the silicon melt 3 by means of heating, with the graphite crucible employing an induction current is a low-cost heating format. All of those formats are widely used in metallurgy and are simple heating formats.

The melt temperature retention means 6 is a device in order to hold the high temperature of the surface of the melt. The melt temperature retention means 6 is configured from an annular shaped thermal insulation material covering part of the aperture means of the crucible and is circular shaped in FIG. 1, but is not limited to the shape specified in FIG. 1. Now, with the crucible and the shape of the heating means and the disposition thereof, if the high temperature of the melt surface is retained, the fitting of a melt temperature retention means may not be necessary.

Moreover, the device configuration example represented in FIG. 1 suffices in order to continuously process the metallic silicon raw material. In other words, the configuration of FIG. 1 is for the purposes of continuous purification processing of several tens of charges of silicon, and the raw material supply chamber 20, and the silicon melt reception chamber 21 are connected to the processing chamber 2 via a gate valves 14, moreover, the crucible 4 in the processing chamber is equipped with a mechanism to be tilted so that the purified silicon is recovered in the vessel 23 in the melt reception chamber 21 (not illustrated in the figures).

The mechanism for the insertion of the silicon raw material to the interior of the crucible 4, before phosphorus removal processing, is not limited to the following, but for example, as illustrated in FIG. 1, the raw material supply chamber 20 is connected to the processing chamber 2 via a gate valve, and by equipping the vacuum pump (pressure reduction means) 1 with an inert gas supply line is not illustrated in figures, there is no exposure to the air, and after raw material supply chamber 20 is pressure equalised with the processing chamber 2, the gate valve 14 is opened, and the raw material insertion hopper which is not shown in the figures is opened, and this mechanism where the silicon raw material is inserted to the interior of the crucible 4 is one preferred embodiment.

While the mechanism for exhausting the silicon melt, which has the phosphorus removal processing completed, to the exterior is not limited to the following, for example, as illustrated in FIG. 1, the silicon melt reception chamber 21 is connected to the processing chamber 2 via a gate valve 14, and by means of the provision of an inert gas supply line which is not illustrated in the drawings, to the vacuum pump (pressure reduction means) 1, there is no exposure to the air, and after the pressure of the silicon ELT reception chamber 21 and the processing chamber 2 are equalised, the gate valve 14 is opened, and by the tilting of the processing chamber 2, which can have its pressure reduced, and the graphite crucible 4 in unison, the silicon melt is exhausted from the silicon melt exhaust aperture disposed on the upper means of the graphite crucible 4, and by means of a mechanism so that the gate is spanned by a trough, the silicon melt is transported to a vessel 23 provided in the silicon melt reception chamber 21 in one preferred embodiment. Alternatively, a valve can be fitted to open and close the base of the graphite crucible 4, as well as connecting the silicon reception chamber 21 via a gate valve in the lower direction of the crucible in the processing chamber 2, in a further preferred mechanism where the vessel 23 is disposed in the silicon melt reception chamber 21.

In FIG. 1, the impurity condensation means 7 of the impurities capture device is disposed directly above the crucible 4, and the impurities reception and containment means 8 of the contamination prevention device is disposed directly below this impurities condensation means 7. In regard to the impurities condensation means 7 of the impurities capture device, a cylindrical shaped metallic member with cold water running through the interior thereof is illustrated in FIG. 1, but for example, it may also be formed from the disc shaped metallic member, which is water cooled, or it may be formed by a coil shaped metallic member which is water cooled, or it may be a metallic disc or cylindrical shape, indirectly cooled by radiation cooling by means of a water cooled member. No matter which configuration is employed, the impurities vapour evaporating from the liquid surface of the silicon melt is cooled, such that the capture of the impurities by the impurities condensation means is enabled, and the impurities capture device may be disposed at a geometric position enabling the facing thereof to the free surface of the silicon melt 3, and the phosphorous evaporating from the free surface of the melt deposits on the surface of the impurities condensation means 7 of the impurities capture device, together with either or both of the evaporated silicon, and/or SiO. At least the surface of the impurities condensation means 7 may be appropriately comprised of metals such as steel, stainless steel, copper and the like, or from graphite or alumina and the like.

The contamination prevention device which is one of the features of the present invention, on the occasion of the dropping down of impurities captured by the impurities capture device, operates to prevent the contamination of the silicon melt by having an impurities reception and containment means receiving and containing these impurities. In FIG. 1, the preparatory chamber 22 provided with a vacuum pump (a pressure reduction means) 1 is connected to the processing chamber 2, via the gate valve 14, and the impurities reception and containment means 8 is comprised of a plate shaped member held by means of the reception and containment means displacement mechanism (not illustrated in the figures), so as to enable the free displacement thereof between the processing chamber 2 and the preparatory chamber 22. In other words, the preparatory chamber 22 enables the free operation between the atmosphere and reduced pressure, without breaking the vacuum condition of the processing chamber 2 by means of the gate valve 14 and the vacuum pump 1, and therefore, the impurities reception and containment means 8 of the contamination prevention device can be displaced freely between processing chamber 2 and the preparatory chamber 22, without reference to the pressure stages of the processing chamber 2, and is stored in the preparatory chamber 22 during the phosphorous removal process, and when the phosphorus removal processes are suspended or the phosphorus removal processes are terminated, the impurities reception and containment means of the contamination prevention device is disposed at a operational position between the impurities condensation means of the impurities capture device and the liquid surface of the silicon melt, so as to be directly below the impurities condensation means 7, in respect of the impurities capture device, and directly above the aperture of the melt temperature retention means 6, so as to receive and contain the impurities which dropped down.

In order to be exposed to the high radiation temperature of the silicon melt in the operational position, the substance of the impurities reception and containment means 8 of the contamination prevention device is preferably configured from a high temperature resistant graphite, or carbon composite or thermally insulated graphite, or a combination of these, but a temperature resistant metal such as molybdenum is also preferable, or when the usage period can be foreshortened, stainless steel or general use steel plate may also suffice. The impurities reception and containment means 8 has a thermal blocking surface blocking the thermal radiation from the liquid surface of the silicon melt with respect to the impurities of the impurities condensation means of the operational position, and not only enables the dropping down of the thermally condensed impurities by the thermal contraction thereof, but also preferably has a reception and containment surface receiving and containing the impurities dropping down on the opposite side of the thermally blocked surface. As to the shape thereof, it may be disc shaped or a square shaped plate, but is preferably comprised of a plate shaped member having a sufficiently large surface area to cover the lower surface of the impurities condensation means 7 of the impurities capture device, enabling the retention of the condensed impurities which dropped down, and may have a thickness to secure a strong resistance to thermal deformation by means of the radiated heat, and as a specific shape thereof, for example, is optimally shaped to hold the condensed impurities which are received and contained therein with the plate shaped provided with an elevated rim on the periphery of the disc.

Hereafter, the operational principles of the contamination prevention device are described in detail while describing the procedure of the continuous phosphorus removal processes of the silicon raw material based on FIG. 2.

Figure 2A:
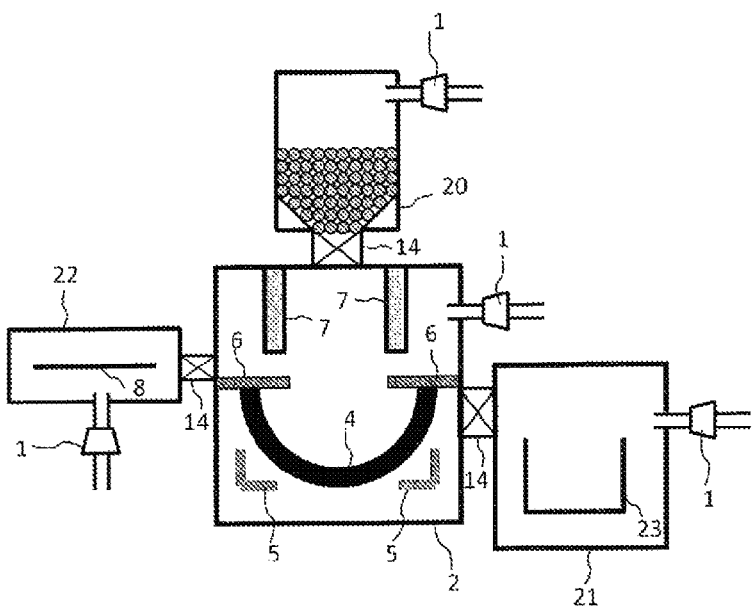
FIG. 2a: A representation of the silicon purification procedure by means of the silicon purification device of the present invention providing a contamination prevention device, (a) is a schematic drawing of the insertion stage of the raw material to the raw material supply chamber.
Figure 2B:
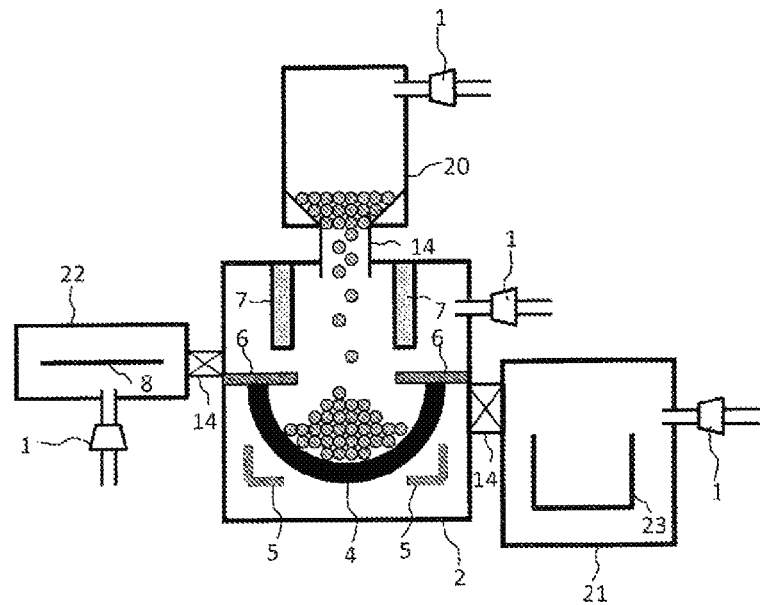
FIG. 2(b): A schematic drawing of the insertion down stage (b) of the raw material to the crucible from the raw material supply chamber, following on from (a).
Figure 2C:
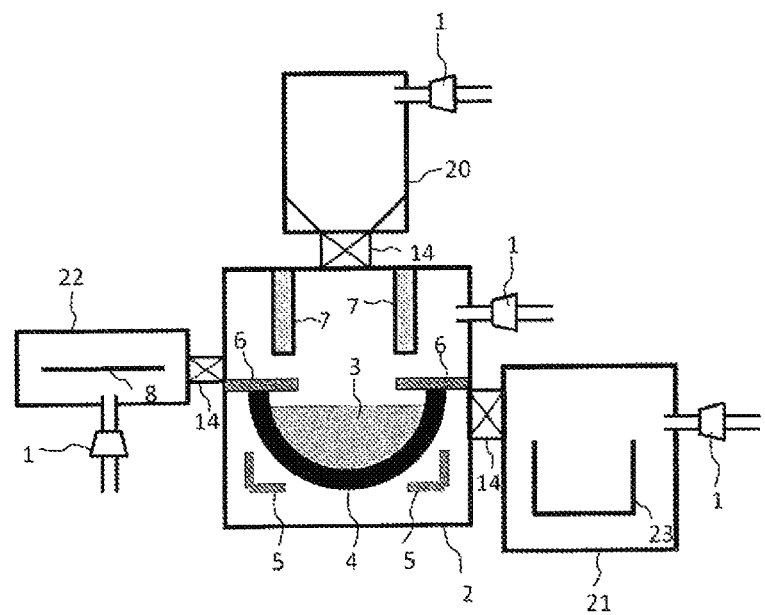
FIG. 2(c): A schematic drawing of the raw material fusion stage (c), following on from (b).

Firstly, in FIG. 2(a), the figure illustrates the insertion stage of the raw material to the raw material supply chamber 20, and the gate valve 14 is closed, and the opening and closing door and the like provided in the raw material supply chamber 20 is opened, and the silicon raw material before the phosphorus removal processes in the raw material supply chamber 20 are inserted. FIG. 2(b) is a figure illustrating the downward insertion of the raw material from the raw material supply chamber 20 to the crucible, and by the raw material supply chamber 20 being equipped with a vacuum pump 1 and an inert gas supply line which is not illustrated in figures, the pressure of the raw material supply chamber 20 is equalised with that of the processing chamber 2 before opening the gate valve 14, and thereafter, the raw material insertion hopper and the like, which is not illustrated in the figures, is opened to insert the silicon raw material, before the phosphorus removal processing, towards the interior of the crucible 4. FIG. 2(c) is a figure illustrating the melting of the raw material stage, and the solid silicon raw material inserted down in FIG. 2(b) is heated and melted.

Figure 2D:
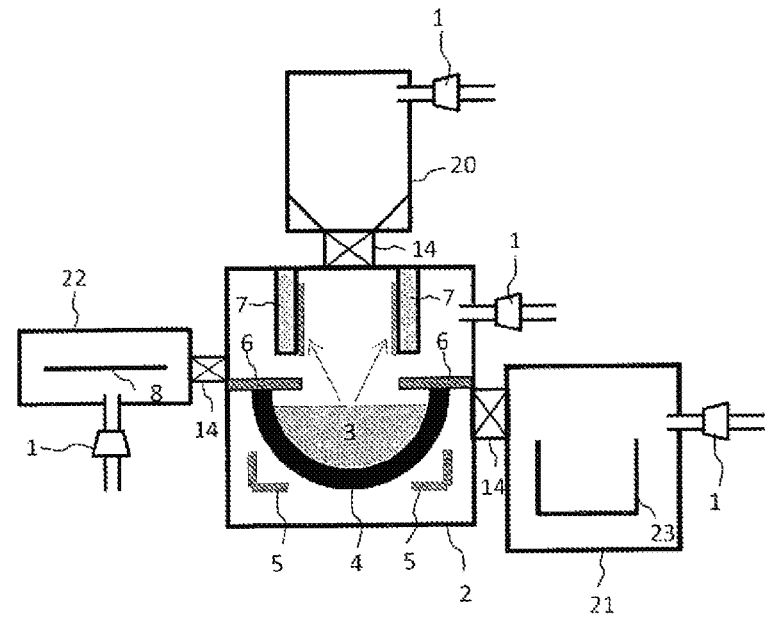
FIG. 2(d): A schematic drawing of the phosphorous removal processing stage (d), following on from (c).
Figure 2E:
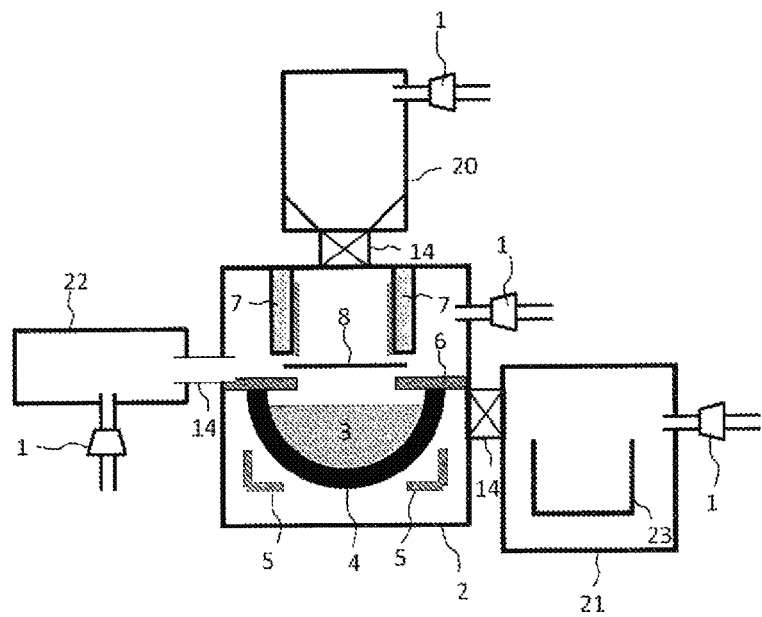
FIG. 2(e): A schematic drawing of the movement stage (e) of the contamination prevention device to directly below the impurities condensation means of the impurities capture device, after termination of the phosphorus removal processes, following on from (d).

FIG. 2(d) is a diagram of the phosphorus removal processing stage, the silicon melt 3 is maintained at a high temperature, and by maintaining a high degree of vacuum by means of the vacuum pump in the processing chamber 2, the phosphorous is condensed in the evaporated and solidified silicon or silicon monoxide film on the surface of the impurities condensation means 7 of the impurities capture device, and the condensed impurities adhere to the surface of the impurities condensation means 7. On that occasion, the impurities reception and containment means 8 of the contamination prevention device is on standby in the preparatory chamber 22. FIG. 2(e) represents the operational look of the contamination prevention device, and when the phosphorus removal processes are suspended or terminated, the impurities reception and containment means 8 is displaced to directly below the impurities condensation means 7 in the diagram of this stage, and represents the state immediately after the displacement thereof.

Figure 2F:
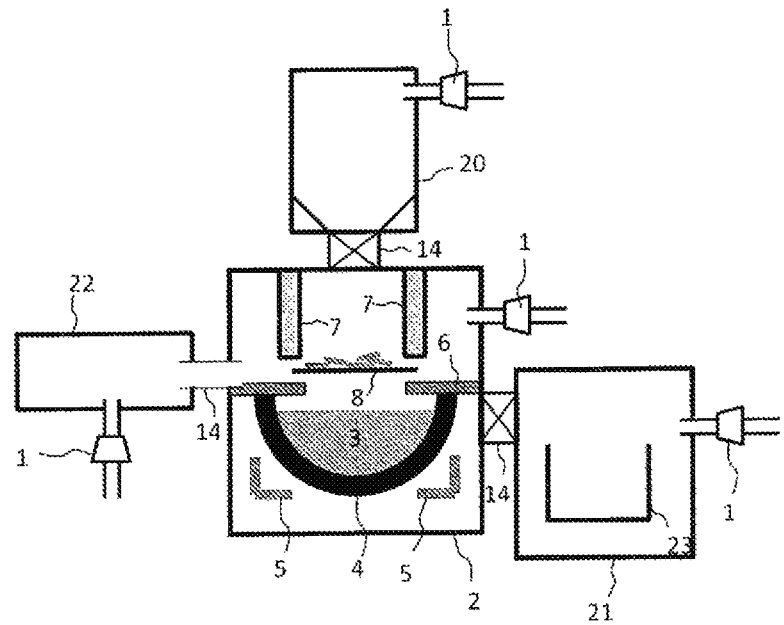
FIG. 2(f): A schematic drawing of the capture stage (f) of the condensed impurities dropped down from the impurities condensation means of the impurities capture device, following on from (e).

FIG. 2(f) is a diagram of the stage wherein the impurities condensed in the impurities condensation means 7 are dropped down and captured by the impurities reception and containment means 8 of the contamination prevention device, and in the operational position of the impurities reception and containment means 8, by blocking the radiated heat from the crucible 4, the temperature of the impurities condensed on the impurities condensation means 7 drops precipitously, and as a result of the differences in the coefficient of thermal expansion between these impurities and the impurities condensation means 7, the peeled off impurities are received and contained by the impurities reception and containment means 8, preventing the condensed impurities from dropping down into the crucible 4.

Figure 2G:
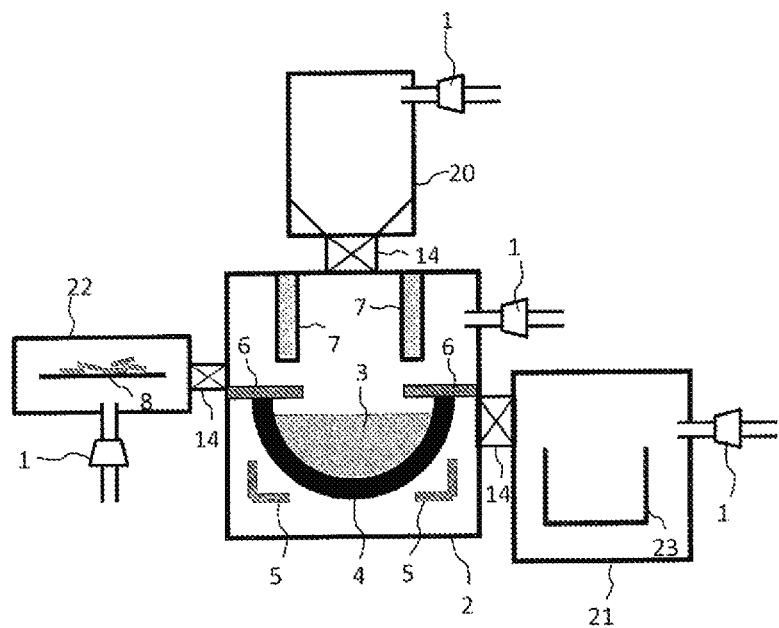
FIG. 2(g): A schematic drawing of the movement stage (g) of the contamination prevention device to the preparatory chamber, following on from (f).
Figure 2H:
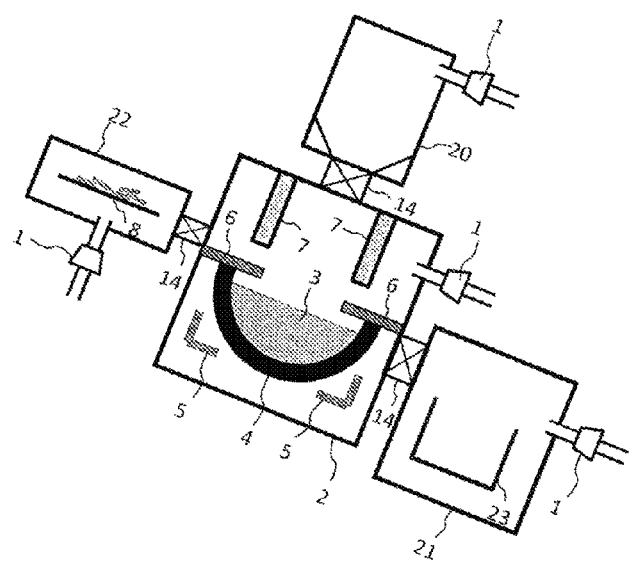
FIG. 2(h): A schematic drawing of the melt exhaust stage (h) of the processed silicon melt to the vessel provided installed in the melt reception chamber, following on from (g).
Figure 2I:
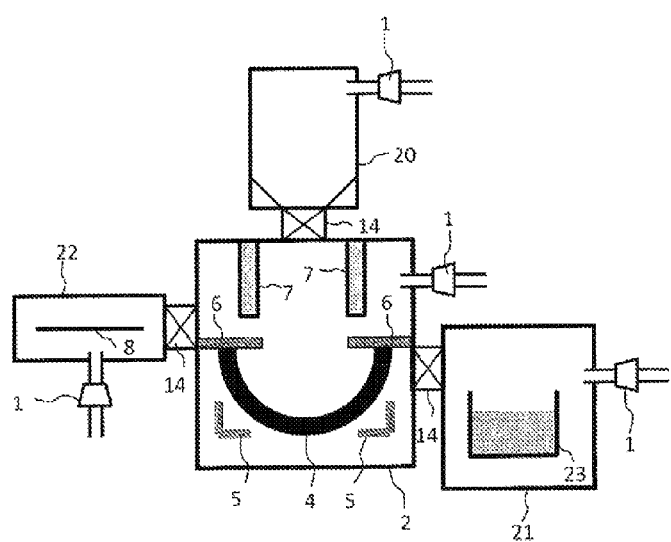
FIG. 2(i): A schematic drawing of the next stage (i) before committing the next charge to processing, following on from (h).

FIG. 2(g) is a diagram of the stage of the displacement of the impurities reception and containment means 8 of the contamination prevention device to the preparatory chamber 22, and after the gate valve 14 is closed, the opening and closing door (not illustrated in the figures) provided in the preparatory chamber 22 is opened, removing the condensed impurities, exhausting the phosphorus to the exterior of the device. FIG. 2(h) is a diagram representing the stage wherein the silicon melt, which has been processed, is exhausted to the vessel 23 installed in the interior of this melt reception chamber 21, and after equalising the pressure between the silicon melt reception chamber 21 with the processing chamber 2, the gate valve 14 is opened, followed by the tilting of the processing chamber 2 and the graphite crucible 4 in unison to exhaust the silicon melt from the silicon melt exhaustion aperture disposed on the upper part of the graphite crucible 4, and by means of a channel mechanism over the gate, the silicon melt is transported to the vessel 23 disposed in the interior of the silicon melt reception chamber 21. FIG. 2(i) is a diagram of the stage where the silicon after the phosphorus removal processes are completed is exhausted, and before entering the next charge process.

As described above, the functions of the contamination prevention device fall broadly into three categories:

(1) The condensed impurities are adhered to a film of either or both of condensed silicon or silicon monoxide with a high concentration of phosphorus therein, but the condensed impurities peel off and drop down at a set probability, and the evaporated and removed phosphorus returns once more to the silicon melt, elevating the phosphorus concentration of the melt. The impurities reception and containment means 8 of the contamination prevention device receive and contain the condensed impurities dropping down from the surface of the impurities condensation means 7, preventing their condensed impurities from dropping down into the silicon melt.

(2) In the phosphorus removal processes, the condensed impurities are normally sustained at a high temperature by means of the heat radiated from the melt, but when the impurities reception and containment means 8 of the contamination prevention device is displaced to directly below the operating position of the impurities condensation means 7 in respect of the impurities capture device, the impurities reception and containment means 8 block the heat radiation from the melt to the condensed impurities, and the temperature of the condensed impurities drops, and the condensed impurities dropped down as a result of thermal contraction. The thicker the thickness of the condensed impurities, the easier they peel, and the amount of condensed impurities which drop down once peeled also increases, resulting in increased phosphorus contamination. Because of this, it was learned that the positive removal of condensed impurities for every charge from the impurities condensation means 7 of the impurities capture device is very important in the enablement of continuous phosphorus removal processing.

(3) In addition, the contamination prevention device has the functions of capturing and holding the condensed impurities. The condensed impurities which condense phosphorus at high concentrations enable the prevention of phosphorus contamination by means of capturing and holding the condensed impurities at a non-specific location in the processing chamber 2. In particular, as illustrated in FIG. 1, by taking out the impurities reception and containment means 8 of the contamination prevention device to the preparatory chamber provided with the gate, the condensed impurities taken out to the preparatory chamber are removed and cleaned, and if the phosphorus is completely removed from the system, this amounts to eliminating the possibility of contamination.

Some of the important aspects of the present invention are the pressure conditions. On the occasion of removing the phosphorus (FIG. 2(d)), the pressure of the interior of the processing chamber is reduced to less than 500 Pa, more preferably less than 10 Pa, and most preferably less than 1 Pa. The lower the pressure, the greater the removal velocity of the phosphorous, but the phosphorus removal velocity saturates at the order of 0.00.1 Pa, and a large-scale vacuum pump is required for the extreme reduction of the pressure, and because the degrees of freedom of the piping equipment, design are inhibited, from the perspective of enabling inexpensive phosphorus removal processing which is the object of the present invention, the lower limit of the pressure may be set at 0.001 Pa.

On the other hand, the more the pressure is reduced, the greater the evaporation velocity of the silicon. Conventionally, in order to enable the lowest possible pressure, there were procedures to sustain the reduced pressure conditions for a long period. In the enablement, of continuous charge processing, as described above, it was very important to concentrate the impurities in a specific location and were concentrated in the impurities condensation means of the impurities capture device, as described above, and by the capture and retention in the impurities reception and containment means of the contamination prevention device, it was found that the procedure of exhausting them outside the system was the most, efficient. Then, the next important point is that, the phosphorus should not be concentrated at non-specific locations other than the impurities condensation means. For that purpose, because the phosphorous is concentrated at the location where the silicon adheres at stages other than those illustrated in FIG. 2, where the phosphorus appears in non-specific locations, the pressure is elevated, suppressing the evaporation of the silicon. As the pressure on that occasion, a pressure higher than 500 Pa is preferred, and a pressure of even greater than 2000 Pa is more preferable, but because of the time required for the recovery of the pressure from the preferred pressure of the phosphorus removal processing of less than 10 Pa, and the requirement for large volumes of the inert gas, there is the disadvantage of the effects on productivity and increased cost, and the pressure of less than 10,000 Pa is sufficient.

As described above, by means of the introduction of the contamination prevention device and the usage procedure thereof and the pressure control, the removed phosphorus is effectively prevented from contaminating this silicon once more, and the continuous and stable removal of phosphorus from the silicon raw material is enabled.

Figure 3A:
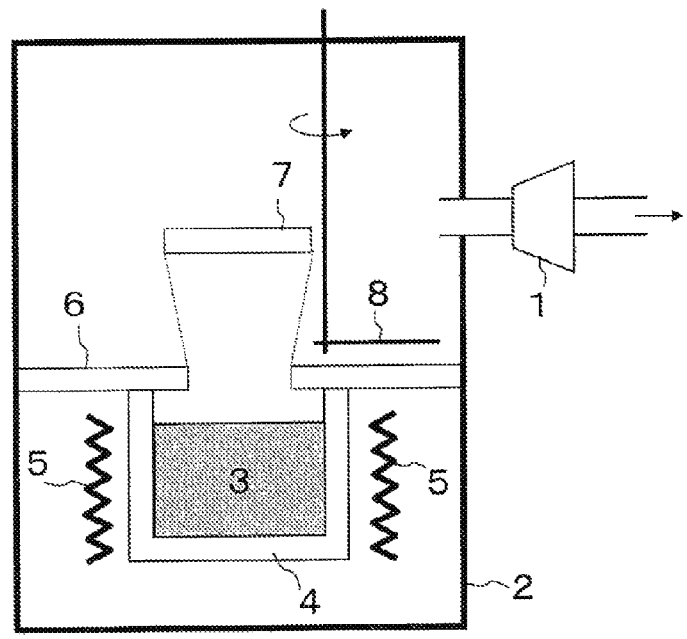
FIG. 3(a): A schematic drawing of a silicon purification device lacking a preparatory chamber, representing the state of the contamination prevention device at the time of phosphorous removal (a).
Figure 3B:
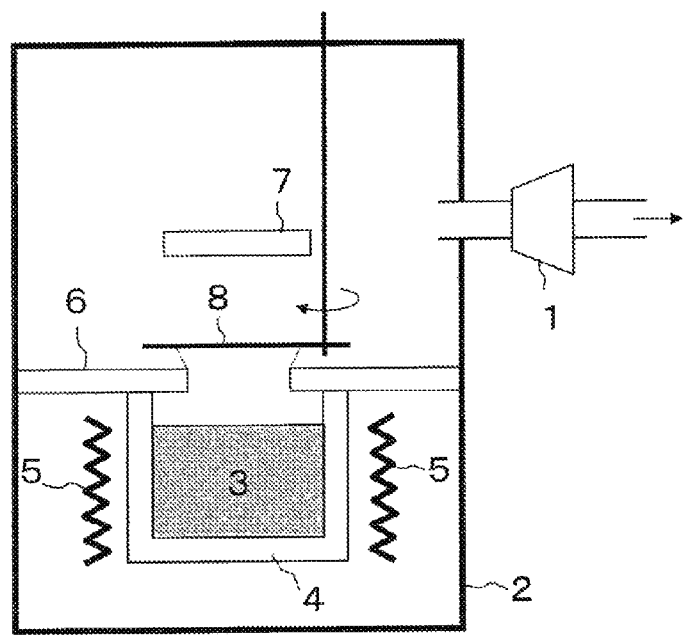
FIG. 3(b): A representation of the state (b) of the contamination prevention device after suspension or termination of the phosphorous removal processes, following on from (a).

However, the configuration of the contamination prevention device is not limited to that represented 3, but that configuration exhibits functionality. The impurities reception and containment means 8 of the contamination prevention device of FIG. 3 is a disc attached to the revolving axis, and is a configuration enabling the displacement in horizontal direction by the revolution of the revolving axis. The impurities reception and containment means 8 of the contamination prevention device, as illustrated in FIG. 3 (a), is positioned so as to avoid coverage of the aperture means of the melt temperature retention means 6 (the standby position) during phosphorus removal processes, and when phosphorus removal processes are suspended or terminated, as illustrated in FIG. 3(b), it is displaced by revolving the revolving axis, to be positioned so as to cover the aperture means of the melt temperature retention means 6 (the operational position). In this configuration, the condensed impurities are eventually exhausted to the exterior of the processing chamber 2. By the attachment of a non-illustrated configuration, or alternatively, the phosphorous processing may be continued for arranged not to exceed the capacity of the capture, and retention of the condensed impurities in the impurities reception and containment means 8 of the contamination prevention device. Now, in FIG. 3, the raw material insertion hopper (the raw material supply chamber 20, etc), and the silicon melt vessel (silicon melt reception chamber 21, etc.) have a configuration which is not illustrated in the figures, and is abbreviated therefrom, and may be according to FIGS. 1 and 2 in accordance with the procedure is of the continuous processing and pressure changes.

The Second Embodiment

Figure 4A:
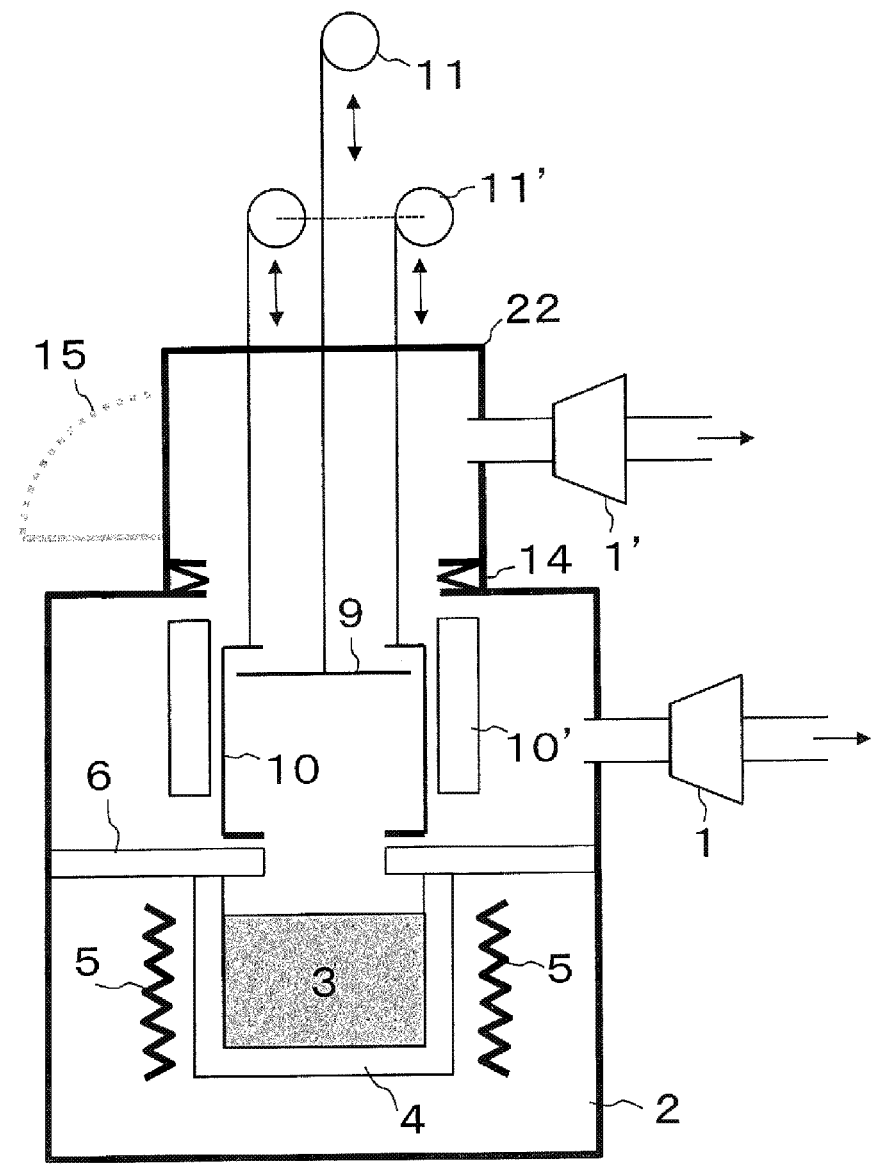
FIG. 4(a): A schematic drawing of a silicon purification device enabling simultaneous containment of the impurities condensation means and the impurities reception and containment means in the preparatory chamber connected via a gate valve, (a) representing the impurities condensation means and the impurities reception and containment means in the phosphorous removal processing.
Figure 4B:
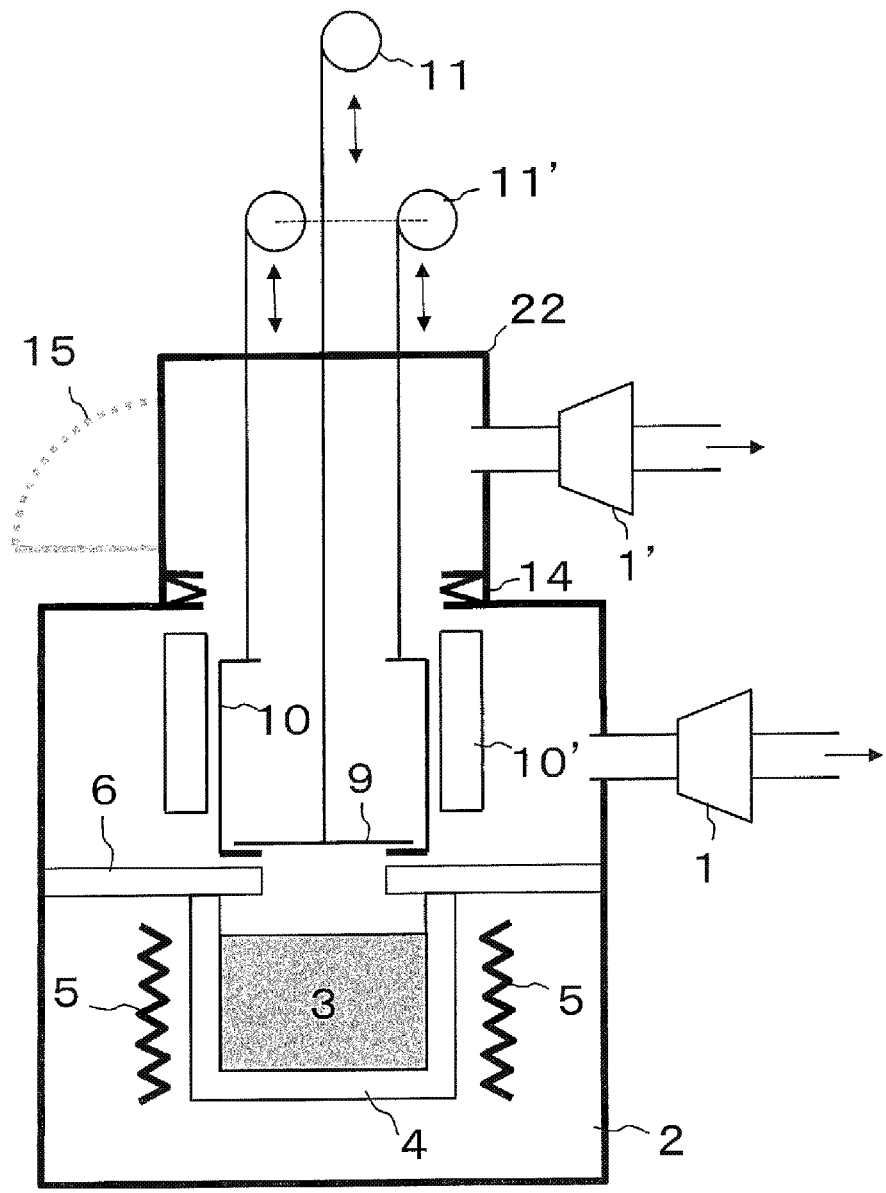
FIG. 4(b): A representation of the state (b) of the impurities condensation means and the impurities reception and containment means after suspension or termination of the phosphorous removal processing, following on from (a).
Figure 4C:
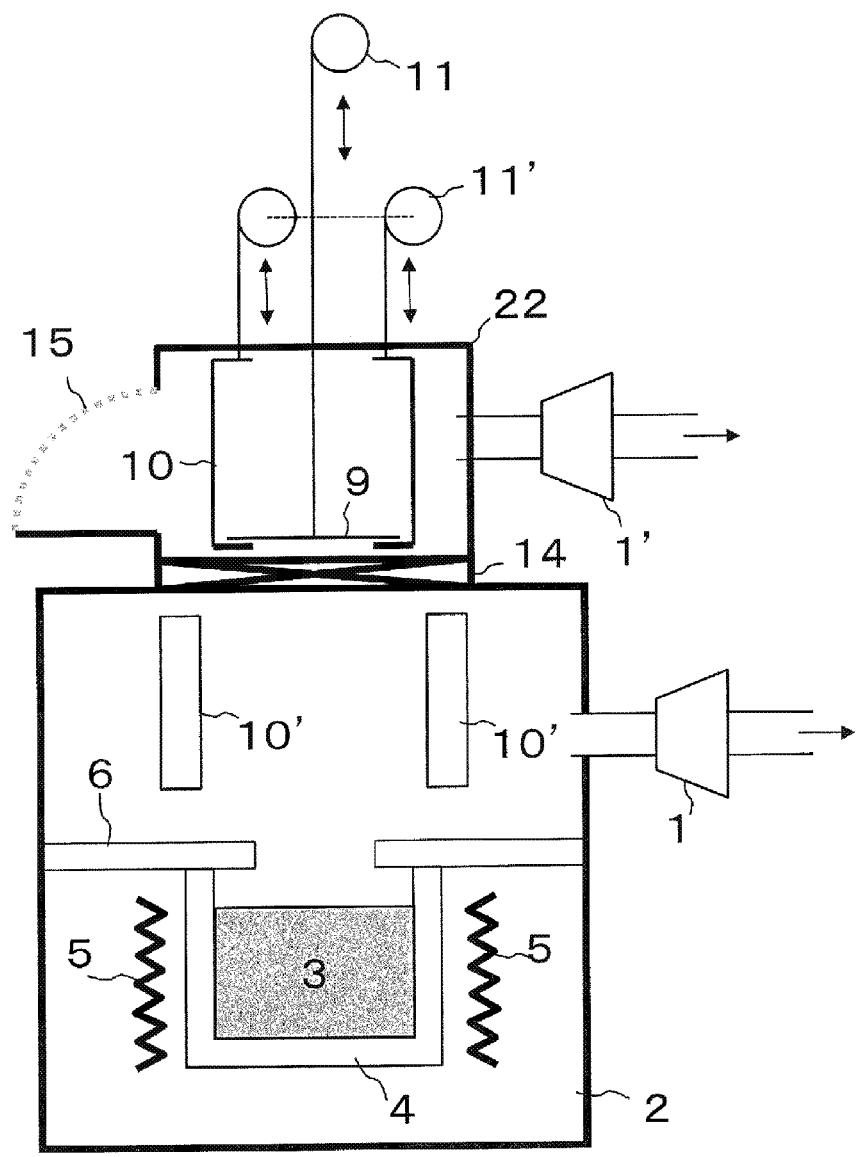
FIG. 4(c): A representation of the state (c) of the impurities condensation means and the impurities reception and containment means contained in the preparatory chamber, following on from (b).

The second embodiment of the present invention is explained using the configuration of the purification device represented in FIG. 4. In the vacuum pump 1, the silicon melt 3, the crucible 4, the heating means 5 and the melt temperature retention means 6 have the same constitutional elements as in the first embodiment, but the positional relationship of the processing chamber 2, the preparatory chamber 22 and the gate valve 14 are not particularly prescribed, have a modifiable upward and downward connection, and related to that the ascending and descending devices (displacement mechanism) 11 and 11' are fitted on to the impurities condensation cover 10 forming the impurities condensation means of the impurities capture device, and onto the disk 9 forming the impurities reception and containment means of the contamination prevention device, moreover, the door 15 is fitted to the preparatory chamber 22. Now, in FIG. 4, while the raw material insertion hopper (raw material supply chamber 20, etc), and the silicon melt vessel (silicon melt temperature retention chamber 21, et cetera) have a configuration which is not illustrated, and is not described here, but the procedures for pressure modification are those of the first embodiment.

In the impurities capture device of FIG. 4, there is no particular limitation to this configuration, but it is a configuration wherein there is a division between the materials having a surface for the condensation of the condensed impurities, and the materials cooled by means of cooling water and the like, and in FIG. 4, they are configured by the cylinder 10 forming the impurities condensation means and the water cooled jacket 10' of the cylinder shape, disposed on the outer side thereof (hereafter, the former is referred to as "the impurities condensation cover"), and the impurities condensation cover 10 is cooled by the radiated heat from the water cooled jacket, and this is an improvement in order to further increase the phosphorus removal effectiveness. By configuring the water cooled jacket independent of the impurities condensation cover 10, on the occasion of cleaning and removing the condensed impurities, it is sufficient to merely displace the impurities condensation cover 10 for the removal thereof, and a mechanism by water cooled materials are displaced for the removal thereof is unnecessary, and the device is simplified.

When the impurities capture device is combined with the contamination prevention device, as illustrated in FIG. 4, at the contamination prevention device represented in FIG. 4, the disc 9 forming the impurities reception and containment means is in contact with the ring shaped member stretched out in the step like manner attached to the lower terminal inner side of the impurities condensation cover 10, enabling the secure prevention of the dropping down of the impurities to the silicon melt 3 by the formation of a cylindrical vessel with a so called bottom comprised of 9 and 10.

In the second embodiment, if the impurities condensation means 9 of the impurities capture device can be stored in the preparatory chamber, there is no particular prescription as to its shape or operation.

The movement of the impurities condensation cover 10 and the disc 9 are explained by means of FIGS. 4 (a), (b) and (c). Firstly, in FIG. 4 (a), the state of the device during phosphorus removal processes is represented, and the impurities condensation cover 10 is within the processing chamber 2, in addition to being above the aperture means of the temperature retention means 6. The disc 9 is located at the upper terminal of the impurities condensation cover 10, and the condensed impurities adhere to the inner surface of the impurities condensation cover 10.

In the event that the phosphorus removal processes are terminated or temporarily suspended, firstly, as illustrated in FIG. 4 (b), only the disc 9 is displaced to the lower terminus of the impurities condensation cover 10. The outer diameter of the disc 9 is made greater than the inner diameter of the step-like ring-shaped drawn out protrusion member attached to the inner lower terminal side of the impurities condensation cover 10, and in order for the disc 9 to close-off the aperture of said ring, even if the condensed impurities attached to the inner surface of the impurities condensation cover 10 should peel and fall down, they are received and contained on the disc 9 and said ring, such that they do not fall down into the silicon melt 3.

Thereafter, the relative positional relationship of the impurities condensation cover 10 and the disc 9 are retained so as to be the same as the same relative positional relationship as illustrated in FIG. 4 (b), and they are each raised using the ascending and descending device (displacement mechanism) 11 and 11', and after storage in the preparatory chamber 22, as illustrated in FIG. 4 (c), and door 15 is opened, and if the condensed impurities are removed by cleaning or change-out of the impurities condensation cover 10 and the disc 9, the phosphorous can be separated completely from the device, and not only is there are no re-contamination of the silicon melt 3, the continued phosphorus removal processing is enabled by employing the cleaned or changed-out impurities condensation cover 10 and disc 9.

In the second embodiment of the present invention, the impurities capture device and a contamination prevention device are assembled together simultaneously, and this enables a simple device configuration providing these functionalities reducing the device costs, and the reliability of the device is high, therefore inexpensive silicon purification is enabled.

The Third Embodiment

The third embodiment of the present invention involves a purification method for silicon removing the impurities in the silicon using the devices described above in the first and second embodiments, and includes a capture stage for the evaporated impurities from the liquid surface of the silicon melt by an impurities capture device, and a stage where contamination of the silicon melt is prevented by the operation of a contamination prevention device. In the capture stage of the impurities, the pressure in the processing chamber comprised of a vacuum vessel is reduced to less than 500 Pa, more preferably to less than 10 Pa, and most preferably to less than 1 Pa, and the silicon raw material is heated to above its fusion point, and is retained in the melt state, evaporating phosphorous and silicon, including silicon monoxide from the silicon melt, and these are captured as condensed impurities by the impurities capture device, to selectively remove the phosphorus from the silicon melt. On the other hand, in the prevention stage of the contamination of the melted silicon, at the high-pressure in the processing chamber of greater than 500 Pa, more preferably greater than 2000 Pa suppressing the evaporation of phosphorus and silicon and the like, the condensed impurities are prevented from dropping down into the silicon melt, to enable the derivation of an optimal low phosphorus concentration purified silicon.

If the condensed impurities dropped down into the silicon melt, the phosphorus concentration, which had been once reduced in the silicon melt, is elevated once more. Moreover, because it is difficult to control the amount of condensed impurities dropping down, the result is a product with insufficient phosphorus removal, and because the phosphorus concentration after processing is not stabilised, normally an unnecessarily long period of processing is required. By means of the present method, the removal of the condensed impurities is enabled, and because the dropping down of the condensed impurities into the crucible is almost completely prevented, purified silicon with a low phosphorus concentration can be derived stably, enabling the setting of a foreshortened purification processing time, resulting in improved productivity.

The silicon purification method of the present invention, on the occasion of the purification of the silicon contained in the crucible, inserts a stage preventing the contamination of the silicon melt by suspending the silicon purification process, and may perform the capture stage of the impurities in plural iterations. In other words, in the prevention stage of the contamination of the silicon melt, after the removal of the impurities received and contained in the impurities reception and containment means, if the capture of the impurities stage is performed thereafter, even with silicon raw material containing high concentrations of impurities such as phosphorus and the like, while preventing the contamination of the silicon melt by means of the capture of the impurities by the impurities capture device, the derivation of purified the silicon with low concentrations of impurities is enabled. Moreover, after the purification processing of the silicon in the crucible is completed, the impurities reception and containment means of the contamination prevention device is located at the operational position between the liquid surface of the silicon melt, and the impurities condensation means of the impurities capture device, in the prevention of the contamination stage of the silicon melt, and the silicon in the crucible can be recovered. By this means, the complete prevention of contamination by the dropping down of the impurities is enabled, while recovering purified silicon.

EXAMPLES

Hereafter, the present invention is explained in more detail based on examples, but the present invention is not restricted by the following contents.

Example 1

The basic configuration of the device used is that shown in FIG. 1. The vessel, which can have its pressure reduced, forming the processing chamber 2 is a water cooled jacketed structure, and is provided with a sealed oil pump, and a mechanical booster pump in a two-stage vacuum pump. A high purity graphite crucible with the outer diameter of 1000 mm, and an inner diameter of 900 mm, and a depth (internal dimensions) of 500 mm can be inserted into the reduced pressure vessel, as well as a high purity graphite heater being located covering the side surfaces and bottom surface of this crucible, and a carbon thermal insulation material is disposed on the outer side of the piece. The graphite heater enables a maximum power of 300 kW of electrical power.

While continuing the heating of the crucible, the following two mechanisms are as illustrated in FIG. 1, in order to enable the continuous phosphorus removal processing in several tens of charges. Firstly, there is the raw material supply mechanism, and it is a mechanism wherein 500 kg of silicon raw material is inserted from the aperture means of the crucible without removing the air atmosphere of the interior of the reduced pressure vessel. Secondly, there is the mechanism, to exhaust the silicon melt on completion of the phosphorous removal processing, and in this example, not only is there a mechanism equipped to tilt the reduced pressure vessel together with the graphite crucible, there is a silicon melt exhaust aperture disposed on the upper means of the graphite crucible, and a silicon melt reception chamber capable of reduced pressure disposed in the melt reception vessel, and by connecting the reduced pressure vessel wherein said crucible is disposed with the silicon melt reception chamber wherein said melt reception vessel is disposed via a gate valve, the silicon melt with the phosphorous removal processing completed, is transported from the crucible to the melt reception vessel without exposure to the air, and thereafter, the processing chamber and the melt reception chamber are mutually separated from each other, enabling the extraction of the processed silicon.

The contamination prevention device is also as illustrated in FIG. 1, and has an impurities reception and containment means comprised of a flat plate held in the displacement mechanism enabling displacement between the processing chamber, and the preparatory chamber, and the preparatory chamber can be freely converted between atmospheric pressure, and reduced pressure, without breaking the vacuum of the processing chamber by means of a gate valve, and the vacuum pump. Therefore, the impurities reception and containment means of the contamination prevention device can be freely displaced between the processing chamber, and the preparatory chamber irrespective of the pressure state of the processing chamber, and during the phosphorous removal processing it is stored in the preparatory chamber, and when the phosphorus removal processing is suspended or terminated, it is disposed directly below the impurities condensation means in respect of the impurities capture device, as well as directly above the aperture of the melt temperature retention means. In this example 1, the preparatory chamber is opened after the storage of each charge in the preparatory chamber, and the condensed impurities captured on the impurities reception and containment means of the contamination prevention device are removed.

If the impurities reception and containment means of the contamination prevention device is sustained in the normal storage position in the preparatory chamber, the phosphorous removal processing which does not employ the contamination prevention device is also possible. In other words, in example 1, the contamination prevention device is used in every charge, and 15 charges of phosphorous removal processing are implemented in sequence. On the other hand, the comparative example also enabled 15 phosphorous removal processes in sequence, but the contamination prevention device was not used at all.

As the preparations for the phosphorous removal processing, firstly, the interior of the reduced pressure chamber disposing the graphite Crucible was flushed with argon gas, and the pressure was reduced to 3000 Pa, and with the pressure of the argon gas atmosphere sustained at 3000 Pa, the crucible was heated and held at 1600° C. In this example 1, 15 charges of the phosphorous removal processing described below were implemented sequentially. One cycle of processing, firstly involved the insertion and fusion of 500 kg of silicon raw material into the crucible, while sustaining an argon gas atmosphere at 3000 Pa, followed by reducing the pressure in the interior of the vessel to less than 10 Pa using the vacuum pump and holding that stage for 12 hours as the phosphorous removal processing, and in addition, after returning the interior of the vessel to an argon gas atmosphere of 3000 Pa, the impurities reception and containment means of the contamination prevention device is displaced to directly below the impurities condensation means in respect of the impurities capture device, in addition to returning the impurities reception and containment means of the contamination prevention device to the stand-by position (preparatory chamber), after recovering the entire exhausted amount of processed silicon melt from the crucible. After the 15 charges have been completed, the temperature of the crucible is reduced while sustaining the pressure of the argon gas atmosphere at 3000 Pa, to complete the continuous processing.

The silicon raw material is employed had an initial phosphorus concentration of 10 ppmw. Part of the solidified silicon exhausted after processing was sampled, and the phosphorus concentration was measured using the ICP emission spectroscopy method, to evaluate the phosphorous removal efficiency. Now, the lower detectable value limit of the analysis of the ICP emission spectroscopy method was 0.02 ppmw.

Table 1 presents phosphorous concentration after processing, the $1 \sim 15^{th}$ charge in example 1 and the comparison example. In example 1, the processed silicon recovered from all of the 1~15 charges could be used as the raw material for solar cells with phosphorus concentrations of less than 0.1 ppmw. On the other hand, there were charges where the phosphorus concentration was less than 0.1 ppmw, but there were also charges where the level was over 0.1 ppmw, and the result was that stable phosphorous removal processing was not enabled, and the effects of the dropping down of the condensed impurities, elevating the phosphorus concentration, were apparent.

Example 2

The basic structure of the device used is as represented in FIG. 3. Other than the configuration of the contamination prevention device being distinct from that of example 1, the raw material supply mechanism, including the melt exhausting mechanism, are the same as in example 1. Moreover, in regard to the procedure of the continuous processing, other than the use of the procedure is of the contamination prevention device described below, the same procedure is as in example 1 were implemented.

As represented in the contamination prevention device illustrated in FIG. 3, there is an impurities reception and containment comprised of a disc shape plate attached to a revolving axis, and the impurities reception and containment means has a mechanism which is displaceable between directly above the operating position of the silicon melt, and the standby position separated from the silicon melt by means of the revolution of the revolving axis. In this example, the material of the disc shaped plate, and the revolving axis where on the disc shaped plate is attached is graphite. The disc shaped plate forming the impurities reception and containment means, as illustrated in FIG. 3 (a), is positioned so as not to cover and avoid the aperture means of the melt temperature retention means during the phosphorous removal processing, and after the phosphorus removal processing is suspended or terminated, as illustrated in FIG. 3 (b), it is displaced by revolving the revolving axis, and is positioned so as to cover the aperture means of the melt temperature retention means. In their device of this second example, because the removal of the condensed impurities captured on the impurities reception and containment means of the contamination prevention device is not possible, the condensed impurities dropping down during the continuous 15 charges accumulated on the impurities reception and containment means. Now, even in this example 2, the impurities condensation means itself of the impurities capture device, has a configuration that enables cleaning, but just as with example 1, by the contamination prevention device receiving and containing the condensed impurities, while it is imperfect, effectively the function of removal of the condensed impurities from the impurities capture device is secured.

Table 1 represents the phosphorus concentration after 1~15 charges processed in example 2. In example 2, throughout all of 1~15 charges, they recovery of processed silicon with a phosphorus concentration of less than 0.1 ppmw which enables the use thereof as raw material of solar cells was enabled. On the other hand, in comparison with example 1, the phosphorus concentration from the 8$^{th}$ charge onwards were charges with the phosphorus concentration was close to 0.1 ppmw, such that the phosphorus concentration was unstable. In this example 2, it is assumed that part of the condensed impurities accumulated the impurities reception and containment of the contamination prevention device overflow, contaminating the silicon melt.

Example 3

The basic structure of the device used is as represented in FIG. 4, and other than provision of the mechanism of simultaneously removing the impurities reception and containment means of the contamination prevention device, and the impurities condensation means of the impurities capture device to the preparatory chamber, which is distinct from that of examples 1 and 2, it is the same as in examples 1 and 2 including the non illustrated raw materials supply mechanism and the melt exhaust mechanism. Moreover, in regard to the procedure of the continuous processing, other than the usage procedures of the contamination prevention device described below, the same procedures were implemented as in the comparative example and example 1 and 2.

The impurities capture device is a configuration with the condensing impurities attaching to the inner side of the impurities condensation cover of a stainless steel cylinder shape, and while the impurities condensation cover forming the impurities condensation means is cooled by radiation cooling by means of the water cooled jacket of the cylinder shape disposed fitted to the exterior thereof, the impurities condensation cover is equipped with a displacement mechanism (Ascending and descending device) enabling displacement of the impurities condensation cover in the height direction, while the water cooled jacket itself is left in the processing chamber and is not displaced, it can be displaced from the gate valve closed position, to the position enabling arrival at the surface of the silicon melt temperature retention means installed on the upper surface of the crucible.

The contamination prevention device is also as illustrated in FIG. 4 and has an impurities reception and containment means comprised of a stainless steel disc, as well as being provided with a mechanism enabling displacement in the vertical direction (The ascending and descending device) independent from the impurities condensation cover, and can be displaced to a lower limit of the lower terminal position of the impurities condensation cover. Here, a ring shaped member is provided drawn out in a step-like shape on the inner lower terminal side of the impurities condensation cover, in addition to the inner diameter of the ring shape being created smaller than the outer diameter of said stainless steel disc, and by either lowering the disc or elevating the impurities condensation cover, the aperture of the lower terminal of the impurities condensation cover is closed off when both reach an interference height, completely preventing the dropping down of condensed impurities from the impurities condensation cover.

In Example 3, the impurities condensation means itself of the impurities capture device also has a cleanable configuration, and after storage in the preparatory chamber after suspension or termination of phosphorous removal processing (FIG. 4 (c)), the condensed impurities adhered to or accumulated on the impurities condensation means and the impurities reception and containment means, are almost completely removed at the time of each charge, such that the they cannot accumulate in the processing chamber and cannot contaminate the silicon melt.

The phosphorous concentrations after processing of the 1~15$^{th}$ charges of example 3 are represented in Table 1, but through all the charges of 1~15, the recovery of processed silicon with a phosphorous concentration of less than 0.1 ppmw which can be used as raw material for solar cells was enabled. Moreover, a concentration of less than 0.02 ppmw was derived stably in all charges, enabling a further stabilized phosphorous removal processing compared with examples 1 and 2, enabling a foreshortening of the processing time and improved productivity.

TABLE 1

Analysis values of the phosphorous concentration (Units: ppm)

| Charge No. | Comparison example | Example 1 | Example 2 | Example 3 |
|---|---|---|---|---|
| 1 | 0.08 | <0.02 | <0.02 | <0.02 |
| 2 | 0.12 | <0.02 | <0.02 | <0.02 |
| 3 | 0.09 | <0.02 | <0.02 | <0.02 |
| 4 | 0.05 | <0.02 | <0.02 | <0.02 |
| 5 | 0.23 | <0.02 | <0.02 | <0.02 |
| 6 | 0.11 | <0.02 | 0.03 | <0.02 |
| 7 | 0.07 | <0.02 | <0.02 | <0.02 |
| 8 | 0.05 | <0.02 | 0.04 | <0.02 |
| 9 | 0.18 | <0.02 | 0.03 | <0.02 |
| 10 | 0.18 | 0.03 | 0.07 | <0.02 |
| 11 | 0.15 | <0.02 | 0.04 | <0.02 |
| 12 | 0.19 | <0.02 | 0.09 | <0.02 |
| 13 | 0.25 | 0.04 | 0.05 | <0.02 |
| 14 | 0.23 | 0.03 | 0.06 | <0.02 |
| 15 | 0.31 | 0.02 | 0.08 | <0.02 |

EXPLANATION OF THE REFERENCE NUMERALS

1 and 1' The vacuum pump
2 The processing chamber
3 The silicon melt
4 The crucible
5 The heating means
6 The melt temperature retention means
7 The impurities condensation means
8 The impurities reception and containment means
9 A disc
10 The impurities condensation cover
10' The water colling jacket
11 and 11' The ascending and descending device 12 The processing chamber
14 A gate valve
15 A door
20 The raw material supply chamber
21 The silicon melt reception chamber
22 The preparatory chamber
23 A vessel

The invention claimed is:

1. A silicon purification device for separating and removing the evaporated impurities from the silicon melt generated by the heating and fusion of silicon at pressures below 500 Pa, the device comprising a processing chamber which includes a crucible containing the silicon a heating means, a pressure reduction means and an impurities condensation means for cooling and condensing impurity-containing vapor evaporating from molten silicon
wherein the silicon purification device further comprises an impurities reception and containment means for receiving and containing impurities, the impurities reception and containment means being arranged such that during silicon purification processing, the impurities reception and containment means is located within a preparatory chamber in standby position, and the vapour of the impurities is condensed by the impurities condensations means, and, when the silicon purification processing is suspended and/or terminated, the impurities reception and containment means is located in the processing chamber in an the operating position between the impurities condensation means and the liquid surface of the silicon melt, and receiving and containing the impurities dropping down.

2. The silicon purification device according to claim 1, wherein a silicon melt reception chamber arranged for fused silicon is connected to the processing chamber via a gate valve, and the purified silicon is received and recovered in a vessel in the melt reception chamber.

3. The silicon purification device according to claim 1, wherein a raw material supply chamber equipped with a pressure reduction means and a raw material insertion hopper are connected to the processing chamber via a gate valve, and continuous processing is enabled by the insertion of silicon raw material containing impurities, after the purified silicon is recovered.

4. A silicon purification method removing the impurities in silicon using the silicon purification device according to claim 1, comprising the following steps:
a) Filling the crucible with silicon;
b) Melting the silicon by using heating means;
c) Maintaining the silicon melt at a temperature that allows the silicon to be in melt state, and pressures below 500 Pa thereby the impurities being evaporated and condensed in the impurities condensation means;
d) Recovering the condensed impurities by using the impurities reception and containment means;
e) transporting the silicon melt (3) to the silicon melt reception chamber.

5. The silicon purification method according to claim 4, wherein the pressure in the processing chamber during step (d) is greater than 500 Pa.

6. The silicon purification device according to claim 1, wherein the impurities reception and containment means are contained in a preparatory chamber, and the impurities reception and containment means can be displaced from the preparatory chamber to the processing chamber; such that the processing chamber is connected to the preparation chamber (22) via a gate valve; and the preparation chamber is provided with a vacuum pump.

7. The silicon purification device according to claim 6, wherein while silicon purification processes are being held, the impurities reception and containment means remains inside the preparatory chamber, and when the silicon purification processing is suspended and/or terminated, the impurities reception and containment means are displace through the gate valve provided on the pressure reduction means to the interior of the processing chamber.

8. The silicon purification device of claim 6, wherein the impurities reception and containment means have a thermal blocking surface on one side arranged for blocking the thermal radiation from the liquid surface of the silicon melt and a containment surface on the opposite side arranged for receiving and containing the impurities dropping down from the impurities condensation means in operation position.

9. The silicon purification device of claim 8, wherein the impurities condensation means comprises an impurities condensation cover and the impurities reception and containment means is a disc which is displaced to the lower end of the impurities condensation cover to collect the impurities condensed on the inner surface of the impurities condensation cover.

10. The silicon purification device of claim 1, wherein the impurities condensation means is selected from the group comprising a water cooled disc shaped metallic member, a water cooled cylinder shaped metallic member and a water cooled coil shaped metallic member.

* * * * *